(12) United States Patent
Liu et al.

(10) Patent No.: US 8,653,524 B2
(45) Date of Patent: Feb. 18, 2014

(54) TOUCH-SENSING DISPLAY DEVICE AND METHOD FOR MANUFACTURING THE SAME

(75) Inventors: Po-Yuan Liu, Hsin-Chu (TW);
Ming-Sheng Lai, Hsin-Chu (TW);
Chun-Hsin Liu, Hsin-Chu (TW);
Kun-Hua Tsai, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 118 days.

(21) Appl. No.: 13/446,468

(22) Filed: Apr. 13, 2012

(65) Prior Publication Data

US 2012/0194464 A1    Aug. 2, 2012

Related U.S. Application Data

(62) Division of application No. 12/232,846, filed on Sep. 25, 2008, now Pat. No. 8,178,383.

(30) Foreign Application Priority Data

Oct. 12, 2007 (TW) .............................. 96138186 A

(51) Int. Cl.
*H01L 29/04* (2006.01)

(52) U.S. Cl.
USPC .................... 257/59; 257/E29.273

(58) Field of Classification Search
USPC .................................. 257/84, 434
See application file for complete search history.

(56) References Cited

U.S. PATENT DOCUMENTS

| 6,791,535 B2 * | 9/2004 | Suzuki ............................ 257/59 |
| 6,982,432 B2 * | 1/2006 | Umemoto et al. .............. 257/12 |
| 7,411,211 B1 * | 8/2008 | Yamazaki ....................... 257/59 |
| 2004/0135773 A1 | 7/2004 | Bang et al. |

FOREIGN PATENT DOCUMENTS

| TW | 523628 B | 3/2003 |
| TW | 200625155 B | 12/2005 |

* cited by examiner

*Primary Examiner* — Chandra Chaudhari
(74) *Attorney, Agent, or Firm* — Bacon & Thomas, PLLC

(57) ABSTRACT

A touch panel display and method for manufacturing the same are disclosed. The touch panel display includes a first substrate, a second substrate, a touch-sensing member, and a liquid crystal layer. The first substrate has a first surface and a second surface thereon. The second substrate has an element array and is disposed on the second surface of the first substrate. The touch-sensing member locates on the first surface of the first substrate. Furthermore, the touch-sensing member includes a conductive layer, a patterned electrode layer, and a protective layer. The patterned electrode layer is correspondingly located on the periphery of the first substrate. The protective layer covers the conductive layer, and the patterned electrode layer. The conductive layer locates between the protective layer and the first substrate. In addition, the liquid crystal layer is disposed between the first and the second substrate.

16 Claims, 10 Drawing Sheets

TOUCH-SENSING DISPLAY DEVICE AND METHOD FOR MANUFACTURING THE SAME

This application is a divisional application of pending U.S. patent application Ser. No. 12/232,846, filed Sep. 25, 2008 (of which the entire disclosure of the pending, prior application is hereby incorporated by reference).

BACKGROUND OF THE INVENTION

1. Field of the Invention

The present invention relates to a touch panel display, and more particularly relates to a lightweight and slim touch panel display.

2. Description of Related Art

Touch panel displays, in which the information data is input by touching by fingers or pens on the displaying area, are broadly used in personal computers, notebooks, PDAs, or other similar devices.

A conventional touch panel display comprises a display panel and a touch panel attached to the display panel. The touch panel can be divided into four types, including: capacitor-type, resistor-type, sound waves-type, and infrared-type (optical). As for the general touch panels located in public places, a resistor-type touch panel is often used. With reference to FIG. 1, a conventional touch panel display is represented, wherein a touch panel display comprises: a display panel 10 and a touch panel 20. The display panel 10 comprises a CF substrate (color filter substrate) 11, a TFT substrate (thin film transistor substrate) 12, and an LC layer (liquid crystal layer) 13 locating between the CF substrate 11 and the TFT substrate 12. A black matrix 111, a color resist layer 112, and a transparent electrode layer 113 are located on one side (surface), facing to the TFT substrate 12, of the CF substrate. A polarizing plate 114 is located on the other side of the CF substrate. Besides, a touch panel 20 is located next to the polarizing plate 114. Herein, the touch panel 20 comprises a substrate 21, and a first conductive layer 22 is selectively formed on one surface of the substrate 21. Then, a second conductive layer 23, a patterned electrode layer 24, and a protective layer 25 are sequentially formed on the other surface of the substrate 21. The patterned electrode layer 24 is located on the periphery of the second conductive layer 23, and the protective layer 25 covers the patterned electrode layer 24. Herein, the substrate 21 may be a glass substrate, and each of the first conductive layer 22 and the second conductive layer 23 may be an ITO (indium tin oxide) layer. Finally, a touch panel 20 is formed on the polarizing plate 114 locating on the CF substrate 11, thus a conventional touch panel display is obtained.

However, in such device having a touch panel on one surface of the display panel, the total weight and total thickness thereof are too great, and is difficult to produce a lightweight and slim touch panel display. Moreover, the adding of an extra touch panel will decrease the transmittance of the LCD backlight and lower the brightness of the LCD. Also, the adding of a touch panel on the display panel will increase the cost of the production.

SUMMARY OF THE INVENTION

Therefore, the present invention provides a touch panel display, comprising: a first substrate, a second substrate, a touch-sensing member, and a liquid crystal layer. The first substrate has a first surface and a second surface. The second substrate having a controlling element is correspondingly located on the second surface of the first substrate. The touch-sensing member locating on the first surface of the first substrate comprises: a conductive layer, a patterned electrode layer, and a protective layer, wherein the patterned electrode layer is correspondingly located on the periphery of the first substrate, the protective layer covers the conductive layer and the patterned electrode layer, and the conductive layer locates between the protective layer and the first substrate. The liquid crystal layer disposes between the first and the second substrate.

The above touch panel display of the present invention may further comprise a plurality of color resist layers forming on the second surface of the first substrate.

The above touch panel display of the present invention may further comprise a polarizing plate locating on a surface of the protective layer. The polarizing plate is preferably made of a silicon nitride, a polymer, etc.

The above protective layer of the present invention may be made of a polarizing material to polarize light.

According to the above touch panel display of the present invention, the conductive layer may locate on the first surface of the first substrate, and the patterned electrode layer may locate on the conductive layer. Alternatively, the patterned electrode layer may contact with the first surface of the first substrate, and the conductive layer may cover the patterned electrode layer and the first substrate.

The present invention also provides another touch panel display, which comprises: a first substrate, a second substrate, a polarizing plate, a touch-sensing member, and a liquid crystal layer. The first substrate has a first surface and a second surface. The second substrate having a controlling element is correspondingly located on the second surface of the first substrate. The polarizing plate locates on the first surface of the first substrate. The touch-sensing member locating on the first surface of the first substrate comprises: a conductive layer, a patterned electrode layer, and a protective layer, wherein the patterned electrode layer is correspondingly located on the periphery of the first substrate, the protective layer covers the conductive layer and the patterned electrode layer, and the conductive layer locates between the protective layer and the first substrate. The liquid crystal layer disposes between the first and the second substrate.

The touch panel display of the present invention may further comprise a plurality of color resist layers forming on the second surface of the first substrate.

According to the touch panel display of the present invention, the protective layer is preferably made of a polarizing material in order to polarize light.

According to the touch panel display of the present invention, the protective layer is preferably made of a silicon nitride, a polymer, etc.

According to the touch panel display of the present invention, the conductive layer may locate on the first surface of the first substrate, and the patterned electrode layer may locate on the conductive layer. Alternatively, the patterned electrode layer may contact with the polarizing plate, and the conductive layer may cover the patterned electrode layer and the polarizing plate.

Herein, the conductive layer may be made of a transparent conductive oxide (TCO), for example, an indium tin oxide (ITO), an indium oxide, a silicon indium oxide, an aluminum zinc oxide (AZO), an indium zinc oxide (IZO), an antimony tin oxide (ATO), or a tin oxide.

The first substrate and the second substrate of the present invention are not limited but preferably are glass substrates.

For example, the above touch panel display of the present invention can be provided from the following steps.

First, a first substrate having a first surface and a second surface is provided. Then, a touch-sensing member is formed on the first surface of the first substrate, wherein the steps of forming the touch-sensing member comprise: (A) forming a conductive layer and a patterned electrode layer which locates correspondingly on the periphery of the first substrate; then (B) forming a protective layer covering both the conductive layer and the patterned electrode layer; and preferably (C) forming a color filter on the second surface of the first substrate. Afterwards, a second substrate having a controlling element is provided correspondingly on the second surface of the first substrate. Finally, a liquid crystal layer is deposited in between the first and the second substrate.

The method of fabricating a touch panel display of the present invention may further comprise an annealing process after the touch-sensing member has been formed on the first surface of the first substrate.

According to the method of the present invention, the patterned black matrix may be formed on the second surface of the first substrate before the step (C), but is not limited thereto.

According to the method of the present invention, the method of providing a color filter on the second surface of the first substrate comprises: forming a patterned black matrix and a plurality of color resist layers on the second surface of the first substrate sequentially. Then, a transparent electrode layer is formed on the surfaces of the color resist layer and the black matrix.

According to the method of the present invention, a polarizing plate may further attach to the protective layer, but is not limited thereto.

According to the method of the present invention, the steps of forming the touch-sensing member on the first surface of the first substrate comprise: (A) forming a conductive layer on the first surface of the first substrate; then (B) forming a patterned electrode layer on the conductive layer, in which the patterned electrode layer locates correspondingly on the periphery of the first substrate; and then (C) forming a protective layer on both the conductive layer and the patterned electrode layer. Alternatively, the steps of forming the touch-sensing member on the first surface of the first substrate may be: (A) forming a patterned electrode layer on the first surface of the first substrate, in which the patterned electrode layer locates correspondingly on the periphery of the first substrate; then (B) forming a conductive layer on the first surface of the first substrate and on the patterned electrode layer; and then (C) forming a protective layer on both the conductive layer and the patterned electrode layer.

In an embodiment of the present invention, the touch-sensing member forms directly on the surface of the first substrate, and thus is capable of providing the first substrate with touch-sensing functions. Besides, the protective layer may possess protections and polarizing functions at the same time.

In another embodiment of the present invention, a polarizing plate is first formed on one surface of the first substrate, then a touch-sensing member is formed to give the touch-sensing function.

In another embodiment of the present invention, the conductive layer of the touch-sensing member may be a patterned conductive layer, but is not limited thereto.

Hence, the flat panel display of the present invention, which has a touch-sensing member integrated on (or assembled with) the first substrate, can be manufactured with low cost and the flat panel display obtained according to the present method has the advantages of being highly transparent, lightweight and slim.

Other objects, advantages, and novel features of the invention will become more apparent from the following detailed description when taken in conjunction with the accompanying drawings.

DETAILED DESCRIPTION OF THE PREFERRED EMBODIMENT

Hereinafter, the present invention will be described in further detail with reference to examples and comparative examples. Although the preferred embodiment of the present invention has been described for illustrative purposes, those skilled in the art will appreciate that various modifications, additions and substitutions are possible, without departing from the scope and spirit of the invention as disclosed in the accompanying claims.

The drawings are simplified, and only the elements shown are for description and are not for practice regarding the numbers and shapes thereof.

Example 1

Referring to both FIGS. 2 and 3, wherein a schematic view of a touch panel display and a preparation flow chart of the first substrate are shown respectively, the method of providing a touch panel display of the present example is described below.

First, a first substrate 30 having a first surface 30a and a second surface 30b is provided. Herein, the first substrate 30 can be a glass substrate.

Figure 4:
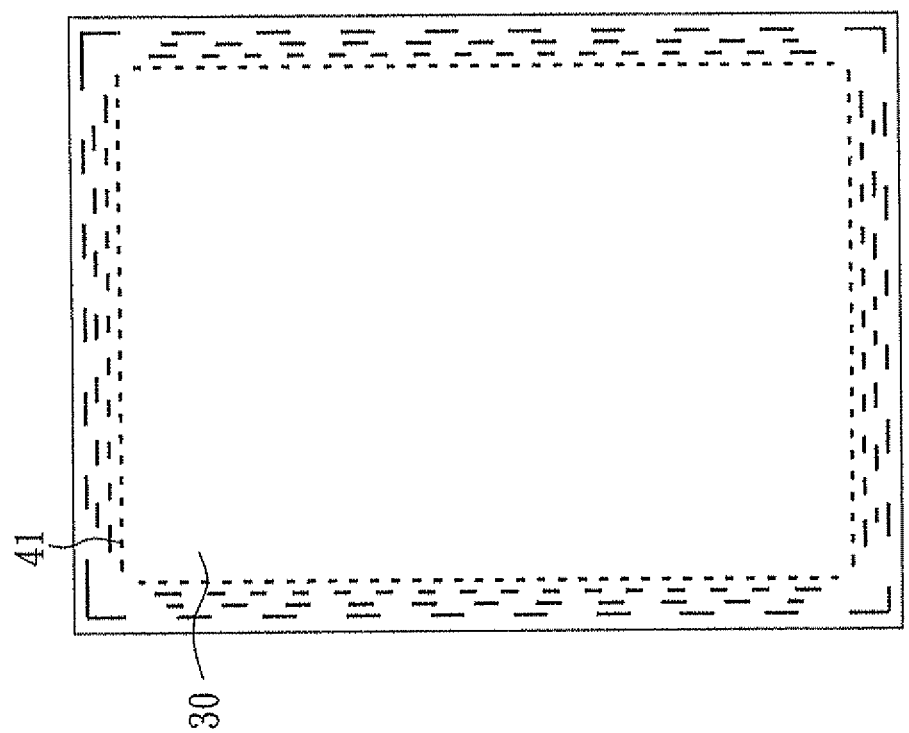
FIG. 4 is a schematic view showing a patterned electrode layer formed on the first substrate according to a preferred embodiment of the present invention.

Then, a touch-sensing member 40 is formed on the first surface 30a of the first substrate 30, wherein the steps of forming the touch-sensing member 40 comprise: forming a patterned electrode layer 41 on the first surface 30a of the first substrate 30, in which the electrode layer 41 may be made of Mo/Al (Al formed before the formation of Mo) or Mo/Al/Mo (Mo formed first, following with Al, and then Mo formed at last). Herein, the patterned electrode layer 41 locates correspondingly on the periphery of the first substrate 30, as shown in FIG. 4. However, the tracing line and the bonding pad connecting outward are not shown here. Next, a conductive layer 42 is formed on the first surface 30a of the first substrate 30 and on the patterned electrode layer 41. The conductive layer 42 may be a transparent conductive oxide, such as indium-tin oxide (ITO), indium oxide, silicon-indium oxide, aluminum-zinc oxide (AZO), indium-zinc oxide (IZO), antimony-tin oxide (ATO), or tin oxide, wherein the conductive layer 42 in the present example is an ITO layer. A protective layer 43 is then deposited on the conductive layer 42. The protective layer 43 here may be made of silicon nitride (SiNx), but is not limited thereto. Afterwards, the first substrate 30 is placed into an oven to perform an annealing process after the formation of the protective layer 43.

Then, a patterned black matrix 31 is formed on the second surface 30b of the first substrate 30, and a plurality of color resist layers 32 are inserted into the black matrix 31. Wherein, the color resist layers 32 can be distinguished into three kinds: red (R), green (G), and blue (B). A transparent electrode layer 33 may be provided on the color resist layer 32 after the formation of the color resist layer 32 (on the second surface 30b of the first substrate 30). The transparent electrode layer 33 can be made using any material that is used in the conductive layer 42. In the present example, ITO is used to provide the transparent electrode layer 33. Consequently, the first substrate 30 having a touch-sensing member 40 is formed.

Figure 1:
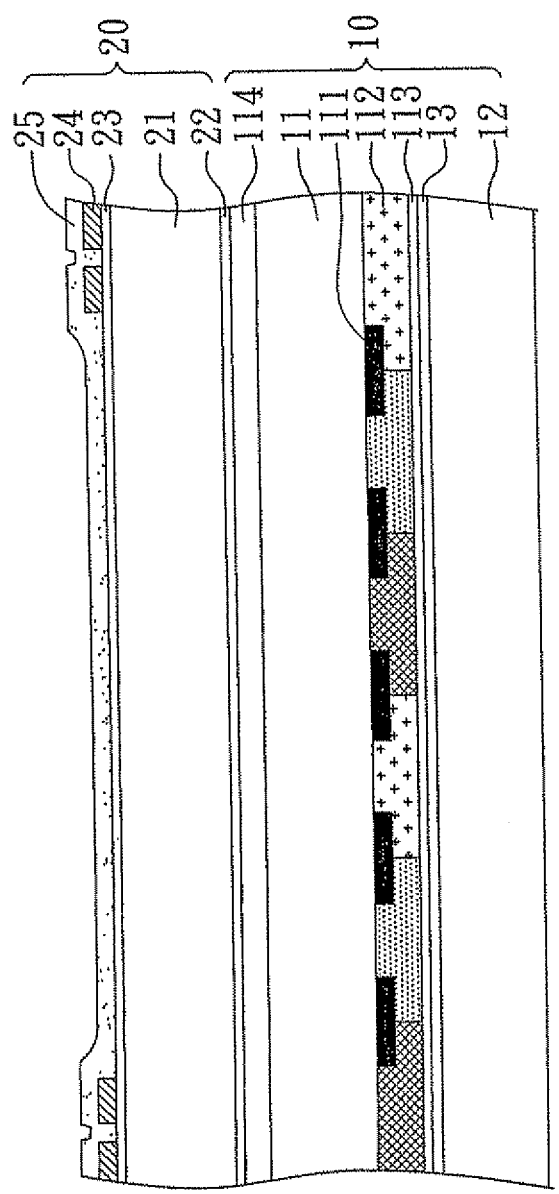
FIG. 1 is a schematic view of a conventional touch panel display.
Figure 2:
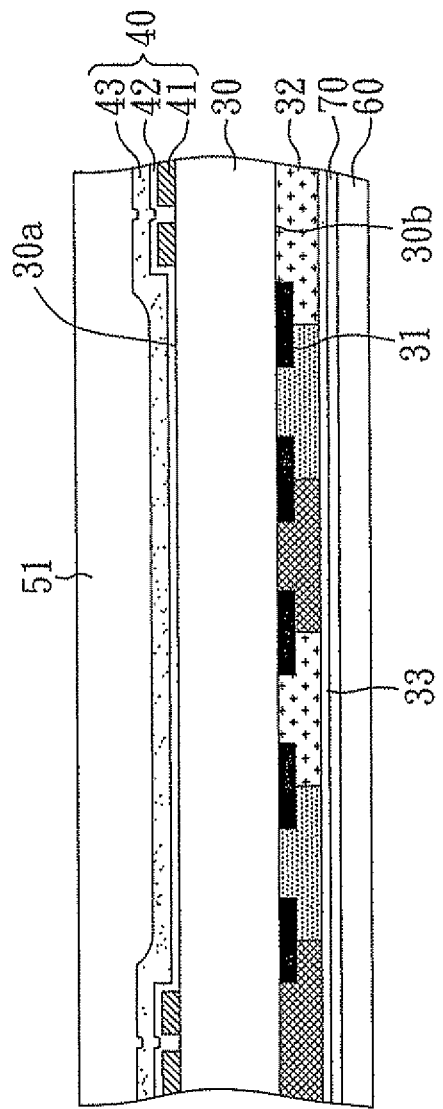
FIG. 2 is a schematic view of a touch panel display of a preferred embodiment of the present invention.
Figure 3:
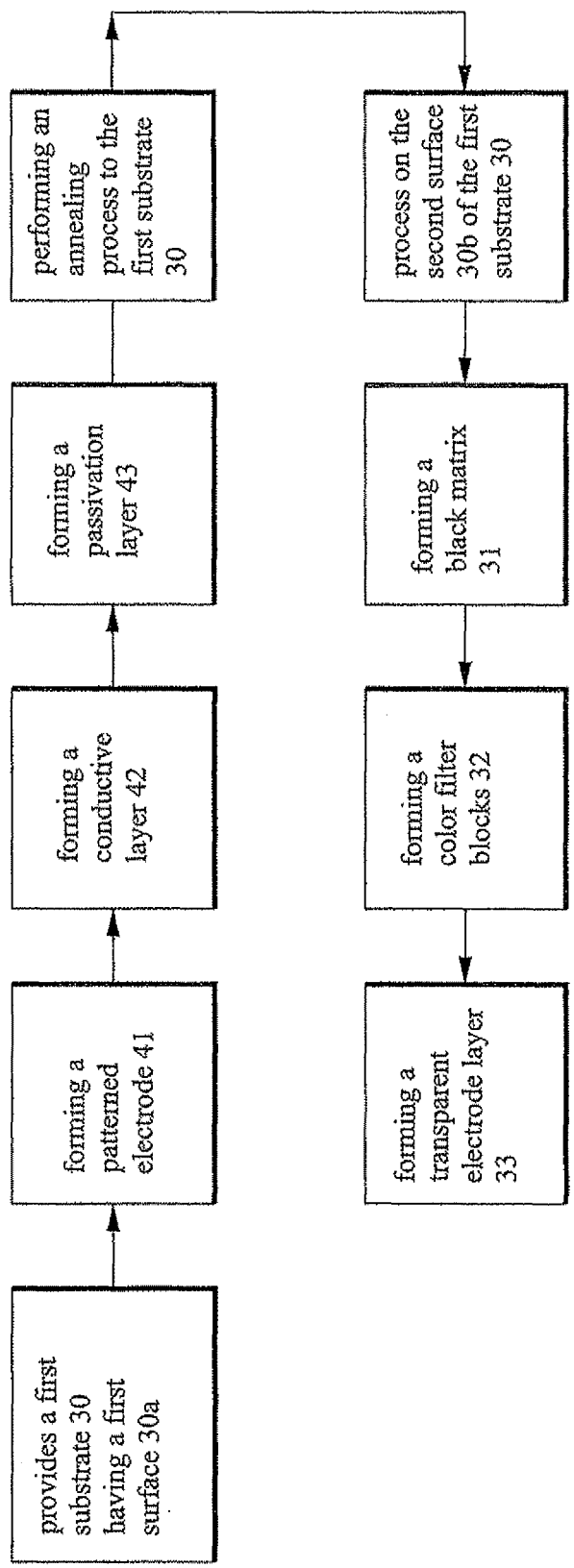
FIG. 3 is a schematic flow chart showing a preparation process of the first substrate of a preferred embodiment.

Moreover, a polarizing plate 51 may provided on the protective layer 43 of the first surface 30a of the first substrate 30 in the present example, as shown in FIG. 2.

Figure 5:
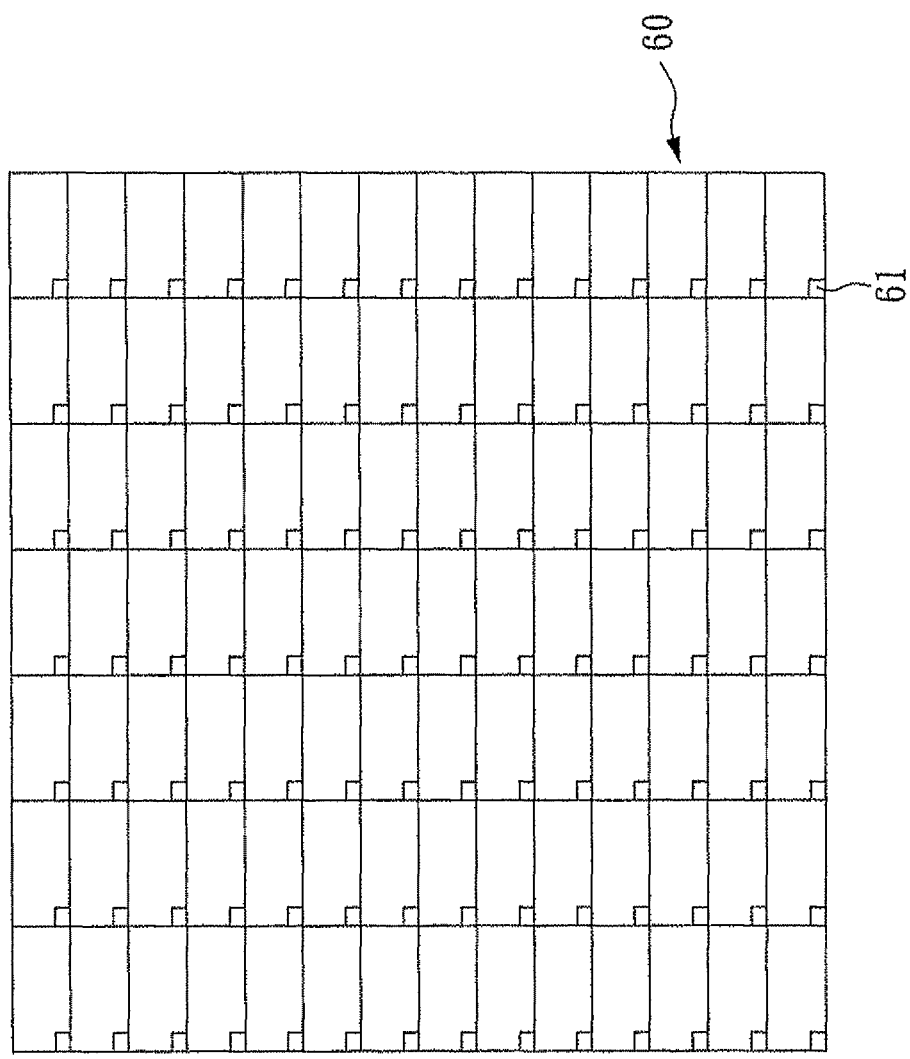
FIG. 5 is a schematic view of a second substrate according to a preferred embodiment of the present invention.

After the completion of the above steps, the first substrate 30 having a touch-sensing member 40 with the second substrate 60 is assembled, and a liquid crystal layer 70 is deposited in between them. Referring to FIG. 5, an upper view of a second substrate 60 of the present example is shown, wherein a second substrate 60 having a controlling element 61 correspondingly locates on the second surface 30b of the first substrate 30 (FIG. 2). Therefore, a slim touch panel display is thus formed.

Example 2

Figure 6:
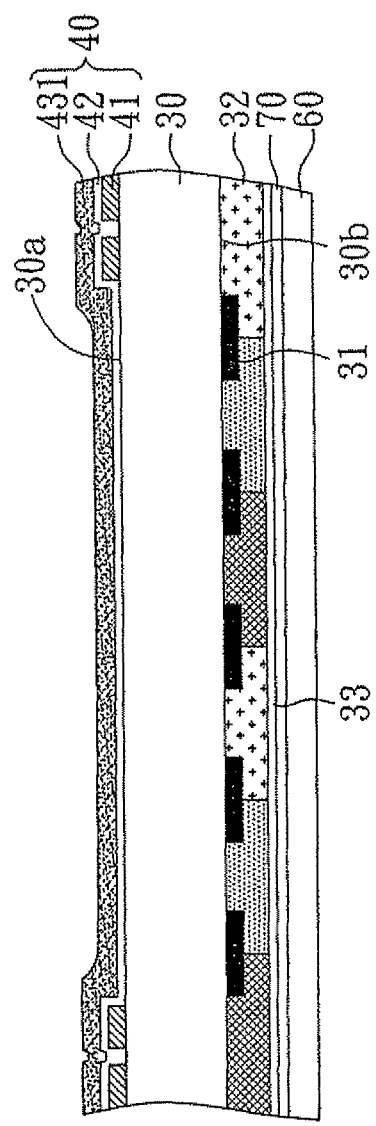
FIG. 6 is a schematic view of a touch panel display of another preferred embodiment of the present invention.

This is the same method as in Example 1, except that a polarizing material or a polarizing plate, which is able to polarize lights, is directly used to replace the silicon nitride (SiNx) to form the protective layer 431 on the conductive layer 42 and on the patterned electrode layer 41 of the present example (as shown in FIG. 6). Thereby, the protective layer 431 of the present example is able to possess the polarizing function (the same as that of the polarizing plate 51, as shown in FIG. 2) and protective function at the same time. Hence, there is no excess need of attaching the polarizing plate 51 (as shown in FIG. 2). Other steps are the same as those of Example 1 to produce a touch panel display.

Example 3

Figure 7:
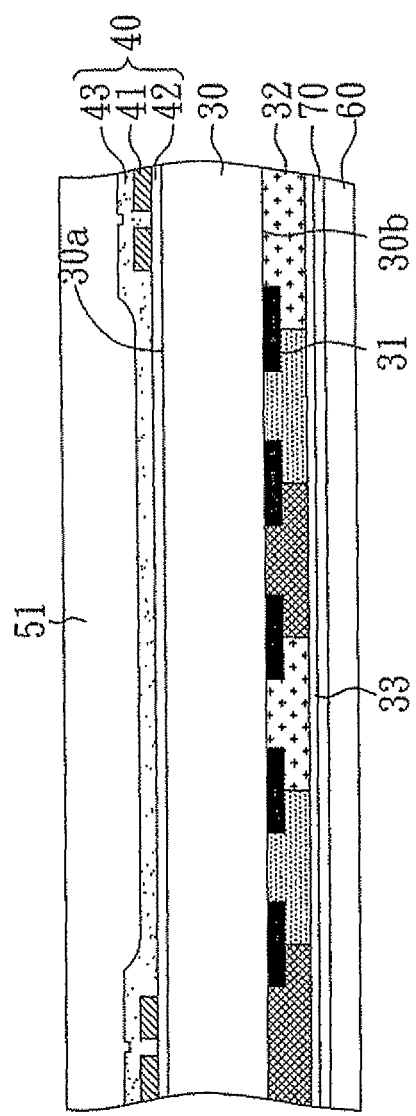
FIG. 7 is a schematic view of a touch panel display of further another preferred embodiment of the present invention.
Figure 8:
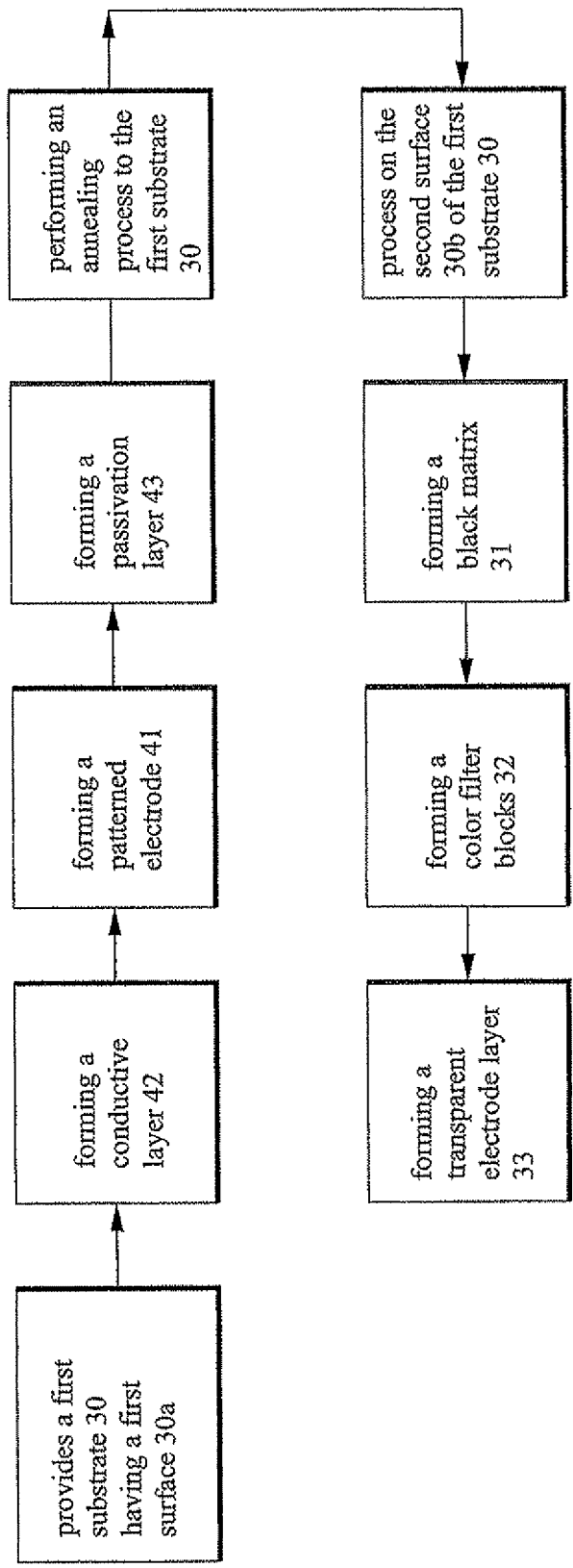
FIG. 8 is a schematic flow chart showing a preparation process of the first substrate of a touch panel display shown in FIG. 7.

With reference to FIGS. 7 and 8, the method of fabricating a touch panel display here is the same as that of Example 1, except that the conductive layer 42 is firstly formed on the first surface 30a of the first substrate 30, then the formation of the patterned electrode layer 41 on the surface of the conductive layer 42 follows when producing the touch-sensing member 40. The electrode layer 41 may be made of Al/Mo (Al formed after the formation of Mo) or Mo/Al/Mo (Mo formed first, following with Al, and then Mo formed at last). The patterned electrode layer 41 locates correspondingly on the periphery of the first substrate 30, and the pattern of the patterned electrode layer 41 may be the same as that in Example 1. Other steps are the same as those of Example 1 to produce a touch panel display.

Example 4

Figure 9:
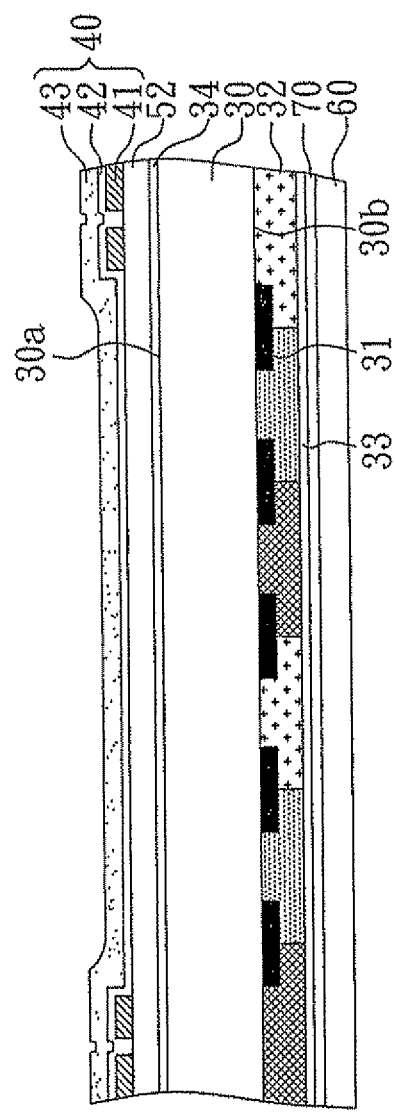
FIGS. 9 and 10 are touch panel displays of other preferred embodiments of the present invention.

With reference to FIG. 9, the method of fabricating a touch panel display here is the same as that of Example 1, except that the polarizing plate 52 is firstly formed on the first surface 30a of the first substrate 30. Wherein, before the formation of the polarizing plate 52, a conductive layer 34 can be selectively formed as a shielding to avoid some electro interference. After that, a touch-sensing member 40 is formed. The method of forming the touch-sensing member 40 is the same as that in Example 1. Other steps of producing a touch panel display are the same as those of Example 1.

Example 5

Figure 10:
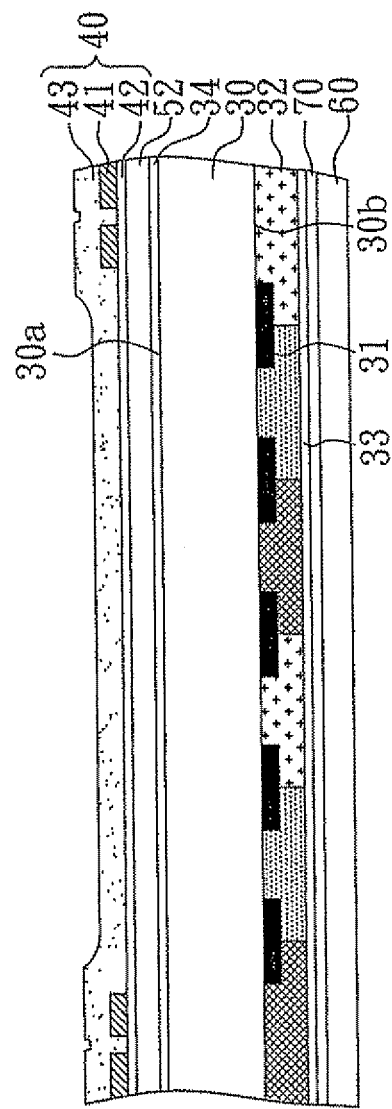

With reference to FIG. 10, the method of fabricating a touch panel display here is the same as that of Example 1, except that the conductive layer 42 is firstly formed on the surface of the polarizing plate 52, then a patterned electrode layer 41 is formed on the surface of the conductive layer 42. The patterned electrode layer 41 locates correspondingly on the periphery of the first substrate 30, and the pattern of the patterned electrode layer 41 may be the same as that in the Example 2. Other steps are the same as those of Example 1 for producing a touch panel display.

As mentioned above, the touch-sensing member (having touch-sensing functions) of the present invention is integrated on (or assembled with) the first substrate (i.e. CF substrate), thus eliminating the step of adding an extra touch panel on the CF substrate, and reducing the total weight and thickness of the touch panel of the traditional touch panel display which cannot approach the demands of being lightweight and slim. Also, the transmittance of the LCD backlight can be improved along with the increase of brightness. Moreover, the target of cost down production is easily achieved in the present invention, which has been an elusive target for the conventional touch panel display.

Although the present invention has been explained in relation to its preferred embodiment, it is to be understood that many other possible modifications and variations can be made without departing from the scope of the invention as hereinafter claimed.

What is claimed is:

1. A touch panel display, comprising:
    a first substrate having a first surface and a second surface;
    a second substrate, having a controlling element, correspondingly locating and facing to the second surface of the first substrate;
    a touch-sensing member locating on the first surface of the first substrate, and the touch-sensing member comprising: a conductive layer, a patterned electrode layer, and a protective layer, wherein the patterned electrode layer is correspondingly located on the periphery of the first substrate, the protective layer covers the conductive layer and the patterned electrode layer, and the conductive layer locates between the protective layer and the first substrate;
    a plurality of color resist layers forming on the second surface of the first substrate; and
    a liquid crystal layer disposed between the first and the second substrate.

2. The touch panel display as claimed in claim 1, wherein the protective layer is a silicon nitride, or a polymer.

3. The touch panel display as claimed in claim 1, further comprising a polarizing plate locating on a surface of the protective layer.

4. The touch panel display as claimed in claim 1, wherein the protective layer is made of a polarizing material.

5. The touch panel display as claimed in claim 1, wherein the conductive layer is located on the first surface of the first substrate, and the patterned electrode layer is located on the conductive layer.

6. The touch panel display as claimed in claim 1, wherein the patterned electrode layer contacts with the first surface of the first substrate, and the conductive layer covers the patterned electrode layer and the first substrate.

7. The touch panel display as claimed in claim 1, wherein the conductive layer is a transparent conductive oxide.

8. The touch panel display as claimed in claim 1, wherein the composition of the conductive layer comprises: indium-tin oxide (ITO), silicon-indium oxide, aluminum-zinc oxide (AZO), indium-zinc oxide (IZO), or antimony-tin oxide (ATO).

9. The touch panel display as claimed in claim 1, wherein the first substrate and the second substrate are glass substrates.

10. A touch panel display, comprising:
a first substrate having a first surface and a second surface;
a second substrate having a controlling element, correspondingly locating and facing to the second surface of the first substrate;
a polarizing plate forming on the first surface of the first substrate;
a touch-sensing member forming on the polarizing plate, and the touch-sensing member comprising: a conductive layer, a patterned electrode layer, and a protective layer, wherein the patterned electrode layer is correspondingly located on the periphery of the first substrate, the protective layer covers the conductive layer and the patterned electrode layer, and the conductive layer locates between the protective layer and the first substrate;
a plurality of color resist layers forming on the second surface of the first substrate; and
a liquid crystal layer disposed between the first and the second substrate.

11. The touch panel display as claimed in claim 10, wherein the protective layer is a silicon nitride, or a polymer.

12. The touch panel display as claimed in claim 10, wherein the conductive layer is located on the polarizing plate, and the patterned electrode layer is located on the conductive layer.

13. The touch panel display as claimed in claim 1, wherein the patterned electrode layer contacts with the first surface of the polarizing plate, and the conductive layer covers the patterned electrode layer and the polarizing plate.

14. The touch panel display as claimed in claim 10, wherein the conductive layer is a transparent conductive oxide.

15. The touch panel display as claimed in claim 10, wherein the composition of the conductive layer comprises: indium-tin oxide (ITO), silicon-indium oxide, aluminum-zinc oxide (AZO), indium-zinc oxide (IZO), or antimony-tin oxide (ATO).

16. A touch panel display, comprising:
a first substrate having a first surface and a second surface;
a second substrate, having a controlling element, correspondingly locating and facing to the second surface of the first substrate;
a touch-sensing member locating on the first surface of the first substrate, and the touch-sensing member comprising: a conductive layer, a patterned electrode layer, and a protective layer, wherein the patterned electrode layer is correspondingly located on the periphery of the first substrate, the protective layer covers the conductive layer and the patterned electrode layer, and the conductive layer locates between the protective layer and the first substrate; and
a liquid crystal layer disposed between the first and the second substrate.

* * * * *